(12) United States Patent
Holman et al.

(10) Patent No.: US 7,355,130 B2
(45) Date of Patent: Apr. 8, 2008

(54) CABLE SEALING DEVICE

(75) Inventors: Glen Allen Holman, Winter Springs, FL (US); Andrew Filtness, Longwood, FL (US); Thomas Herbert Singer, Oviedo, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 185 days.

(21) Appl. No.: 11/053,352

(22) Filed: Feb. 8, 2005

(65) Prior Publication Data

US 2005/0227535 A1 Oct. 13, 2005

Related U.S. Application Data

(60) Provisional application No. 60/560,997, filed on Apr. 9, 2004.

(51) Int. Cl.
*H02G 3/18* (2006.01)
(52) U.S. Cl. .................. 174/658; 174/657; 174/666; 174/668; 174/152 G; 174/153 G; 16/2.1
(58) Field of Classification Search ............... 174/657, 174/658, 666, 668, 153 G, 152 G, 151, 77 R, 174/92, 93, 74 R, 88 S; 16/2.1, 2.2
See application file for complete search history.

(56) References Cited

U.S. PATENT DOCUMENTS

| | | | |
|---|---|---|---|
| 2,827,509 A | 3/1958 | Wayman | |
| 3,331,914 A | 7/1967 | Kavinsky | |
| 4,262,913 A | 4/1981 | Parfree et al. | |
| 4,329,540 A | 5/1982 | Howarth | |
| 4,332,975 A * | 6/1982 | Dienes | 174/76 |
| 5,360,945 A | 11/1994 | Truesdale, Jr. et al. | |
| 5,510,576 A * | 4/1996 | Tenace et al. | 174/658 |
| 5,783,776 A * | 7/1998 | Birmingham et al. | 174/657 |
| 6,118,076 A * | 9/2000 | Damm et al. | 174/77 R |
| 6,149,164 A | 11/2000 | Kreutz | |
| 6,162,989 A | 12/2000 | Garner | |
| 6,215,065 B1 | 4/2001 | Cox | |
| 6,265,670 B1 | 7/2001 | Duesterhoeft et al. | |
| 6,443,457 B1 | 9/2002 | Daoud | |
| 6,617,512 B2 | 9/2003 | Roques | |
| 6,737,579 B1 | 5/2004 | Laufer et al. | |
| 6,768,058 B2 | 7/2004 | Pallapothu | |
| 7,049,515 B1 * | 5/2006 | Collins et al. | 174/668 |

* cited by examiner

*Primary Examiner*—Dhiru R. Patel
(74) *Attorney, Agent, or Firm*—Bell, Boyd & Lloyd LLP

(57) ABSTRACT

A cable sealing device (10) includes a member (14) includes an elastomeric material and adapted to be fitted into a cable receiving aperture. The member includes a first wall (16) and a second wall (18) spaced apart from the first wall to partially define a cavity (20) between the walls. Each wall includes a cable receiving slot (e.g., 22, 24) formed in the wall. Each wall is deformable away from the respective slot to accommodate a respective cable portion (e.g., 26, 28) extended through the slot so that the wall is biased around the cable portion to minimize any opening around the cable portion passing through the slot. The slots in the respective walls cooperate to provide a redundant seal around a cable portion (30) passing through the member.

24 Claims, 4 Drawing Sheets

"CABLE SEALING DEVICE

CROSS REFERENCE TO RELATED APPLICATIONS

This application claims priority to U.S. Provisional Application Ser. No. 60/560,997 filed on Apr. 9, 2004, and incorporated herein by reference.

FIELD OF THE INVENTION

This invention relates generally to the field of cable sealing devices and more particularly, to a cable sealing device for sealing one or more cables having varying thicknesses being passed through a wall.

BACKGROUND OF THE INVENTION

Cables, such as electrical wiring or communication cables, are often required to be passed through a cable receiving aperture in a wall or enclosure. Typically, it is desired to seal the aperture around a cable or multiple cables passed through the aperture to prevent insect, dust, or moisture intrusion through the aperture around the cable. Sealants may be used to seal the aperture around the cable, but such sealants may be unsightly and difficult to later remove. Conventional cable sealing devices are typically sized to accommodate a cable or number of cables having a certain diameter or thickness. Consequently, different sized cable sealing devices may need to be used and kept in inventory to seal cables having different diameters or thicknesses.

DETAILED DESCRIPTION OF THE INVENTION

Figure 1:
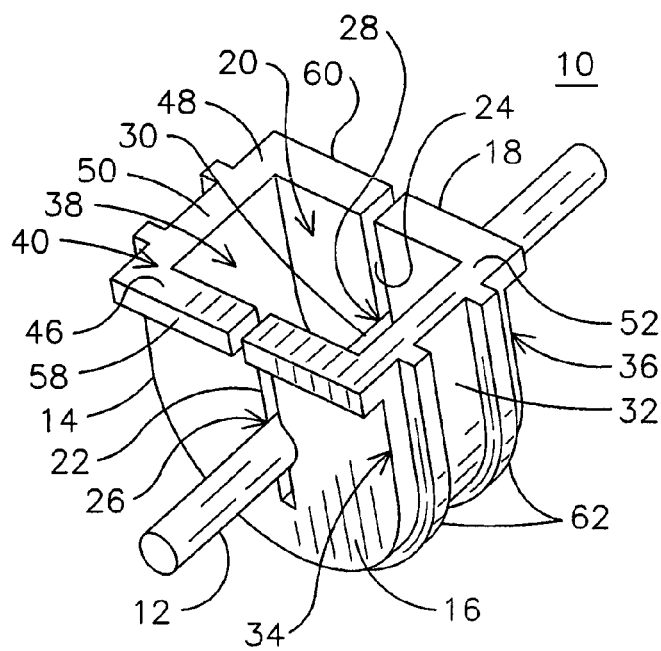
FIG. 1 is an isometric view of an exemplary embodiment of a cable sealing device showing a cable passing therethrough.
Figure 2:
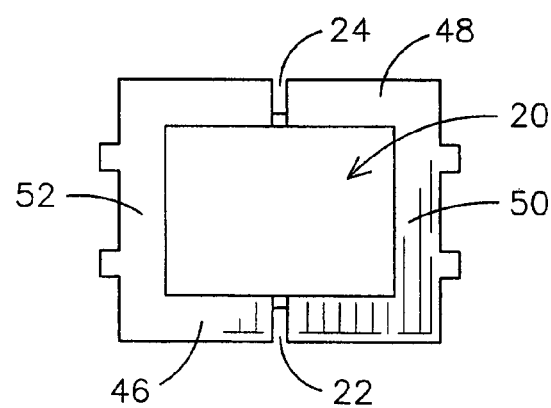
FIG. 2 is top view of the exemplary embodiment of the cable sealing device of FIG. 1.
Figure 3:
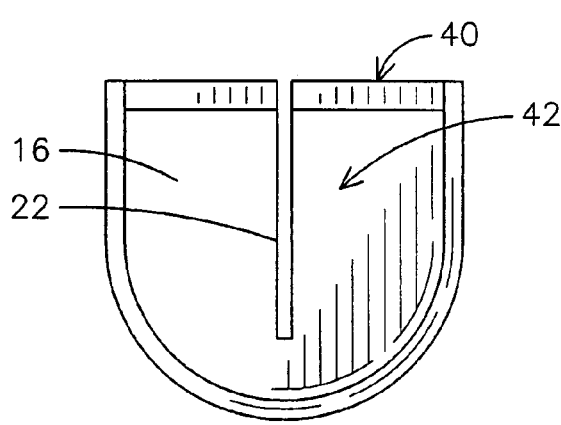
FIG. 3 is front view of the exemplary embodiment of the cable sealing device of FIG. 1.
Figure 4:
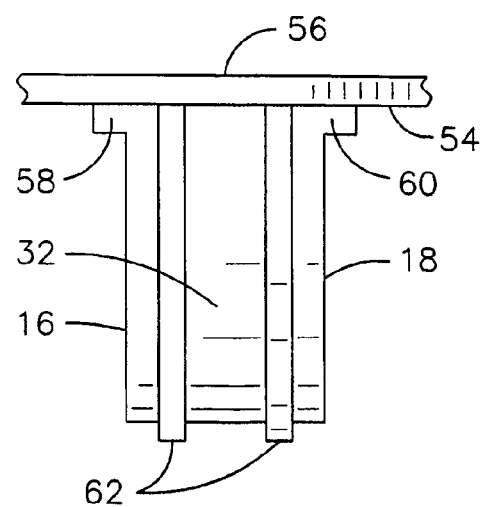
FIG. 4 is a side view of the exemplary embodiment of the cable sealing device of FIG. 1.

FIG. 1 is an isometric view of an exemplary embodiment of a cable sealing device 10 showing a cable 12 passing therethrough. FIGS. 2-4 illustrate top, front, and side views, respectively, of the exemplary embodiment of the cable sealing device 10 of FIG. 1. The device 10 includes a member 14 adapted to be fitted into a cable receiving aperture, such as an aperture formed in a wall or an enclosure for passing a cable therethrough. The member 14 may be sized and shaped to fit in a correspondingly shaped cable receiving aperture that may be typically formed in an enclosure, for example, used as a cable junction box. In an embodiment of the invention, the member 14 may be formed from an elastomeric material having a Shore A durometer hardness between about 35 to 45, and, more particularly, a Shore A durometer hardness between about 38 to 42. For example, the member 14 may be formed from neoprene or an ethylene propylene diene monomer (EPDM) having a desired Shore A durometer hardness.

The member 14 includes a first wall 16 and a second wall 18 spaced apart from the first wall 16 to partially define a cavity 20 between the walls 16, 18. A transverse member 32 may be disposed between and interconnect respective peripheral edges 34, 36 of the first 16 and second walls 18 to further define the cavity 20 between the walls 16, 18. In an aspect of the invention, the member 14 may include a "U"-shaped configuration having an opening 38 at a top 40 of the member 14.

Figure 5:
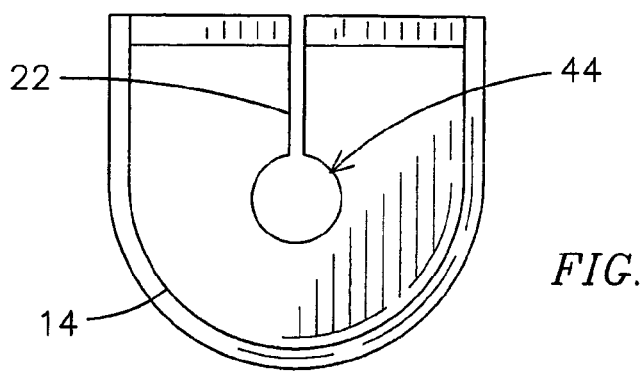
FIG. 5 is front view of another exemplary embodiment of the cable sealing device of FIG. 1.
Figure 6:
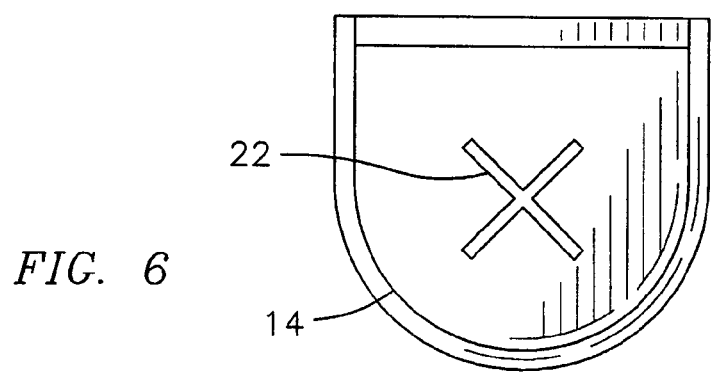
FIG. 6 is front view of another exemplary embodiment of the cable sealing device of FIG. 1.
Figure 7:
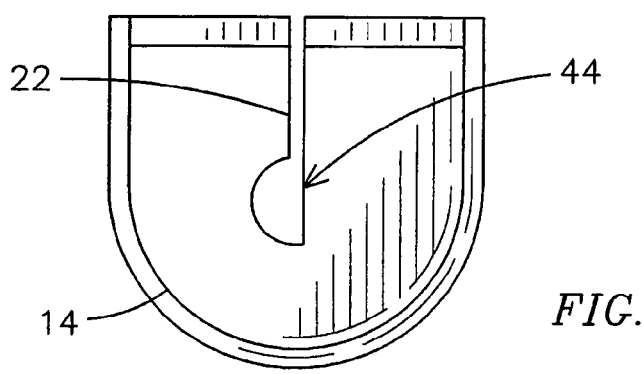
FIG. 7 is front view of another exemplary embodiment of the cable sealing device of FIG. 1.

Each of the walls 16, 18 includes a respective cable receiving slot 22, 24 so that each of the walls 16, 18, for example, comprising an elastomeric material, is deformable away from the slots 22, 24 to accommodate cable portions 26, 28 extended through the respective slots 22, 24. Accordingly, each of the walls 16, 18 remains biased around the respective cable portions 26, 28 extended through the respective slots 22, 24 to minimize any opening around the cable portions 26, 28 passing through the slots 22, 24. In an aspect of the invention, each cable receiving slot 22, 24 may extend downwardly from the opening 38 to at least a central region 42 of the respective wall 16, 18. The slots 22, 24 in the respective walls 16, 18 cooperate to provide a redundant seal around a cable portion 30 passing through the member 14. In an embodiment, a width of the slots 22, 24 may be between 0.0 inches to 0.03 inches. The slots 22, 24 may be configured with a variety of shapes to deformably accommodate cables passed therethrough, such as by having an enlarged opening section 44 as shown in FIGS. 5 and 6. In an aspect depicted in FIG. 5, the enlarged opening section 44 may comprise a circular shape. In another aspect depicted in FIG. 6, the opening section 44 may comprise a "D" shape. In yet another aspect depicted in FIG. 7, the slot 22 may comprise a cross shape. Advantageously, one or more cables, for example, having different cable diameters or different cable thicknesses, may be deformably accommodated by the member 14 to provide a seal around the cable or cables passed therethrough.

As shown in FIGS. 1, 2, and 4, a top edge 46 of the first wall 16, a top edge 48 of the second wall 18, and opposing top edges 50, 52 of the transverse member 32 form a sealing periphery at the top 40 of the member 14 for sealing the opening 38 of the member 14 against a flat surface 54, such as a lid 56 (partially shown in FIG. 1D) disposed over the top 40. In an embodiment, the top edge 46, 48 of each wall 16, 18 may include a lip 58, 60 extending outwardly from the wall 16, 18 to form a sealing surface at the top edges 46, 48 thicker than a thickness of the corresponding wall 16, 18. In another aspect of the invention, the transverse member 32 may include one or more ribs 62 extending outwardly from the transverse member 32 and configured to be fitted in correspondingly shaped recess(es) in a cable receiving aperture when the member 14 is fitted into such an aperture.

Figure 9:
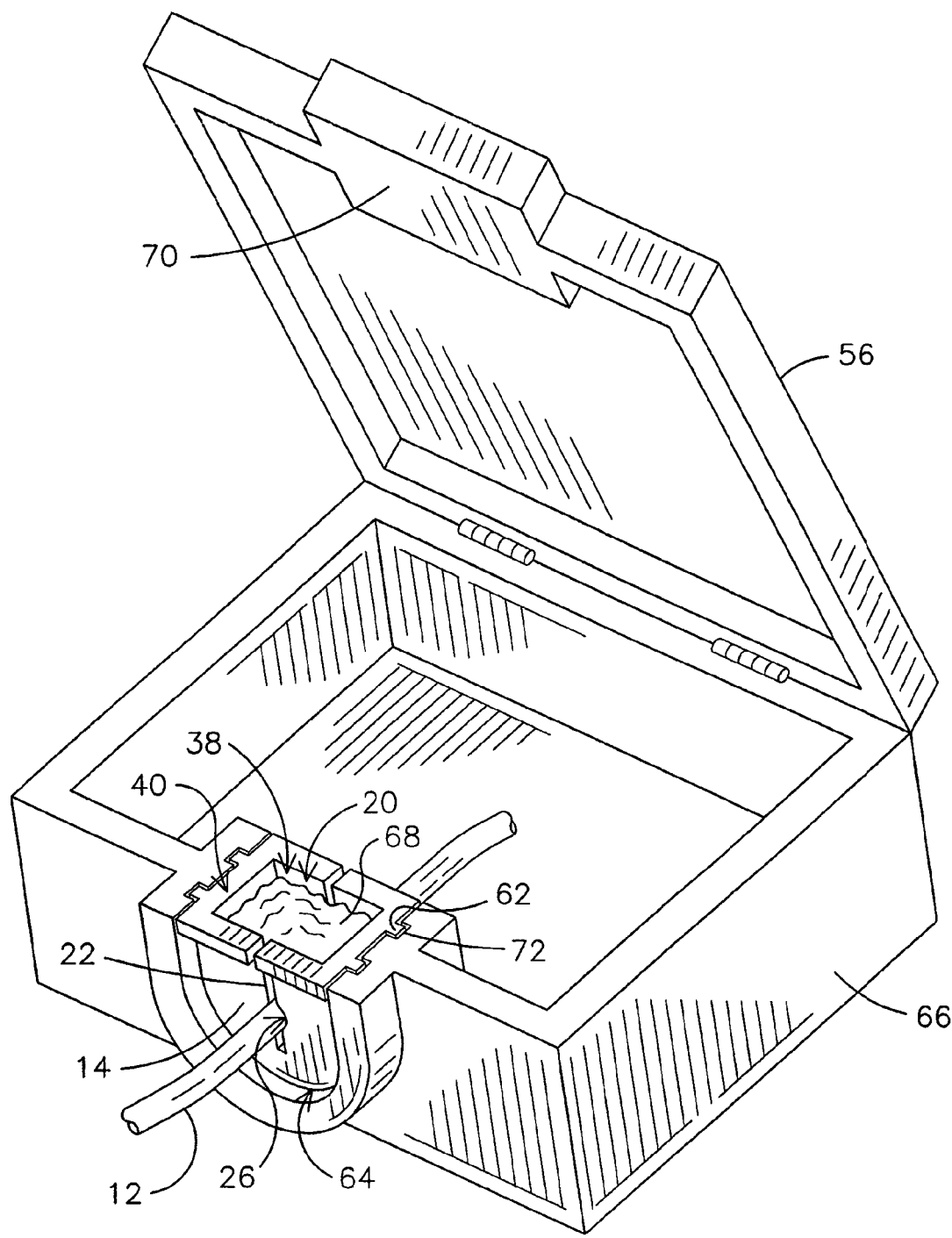
FIG. 9 is an isometric view of the exemplary embodiment of the cable sealing device of FIG. 1 installed in a cable receiving aperture of an exemplary enclosure.

FIG. 9 is an isometric view of the exemplary embodiment of the cable sealing device 10 of FIG. 1 installed in a cable receiving aperture 64 of an exemplary enclosure 66. The enclosure 66 includes a lid 56 (shown in a partially opened position) that includes a flat surface portion 70 for sealing the opening 38 at the top 40 of the member 14 when the lid 56 is closed. The cable receiving aperture 64 of the enclosure 66 may include recesses 72 formed in a periphery of the aperture 64 to receive corresponding ribs 62 (as shown in FIGS. 1-4) formed, for example, in the transverse member 32 of the cable sealing device 10.

In an aspect of the invention, a sealant 68, such as a flowable sealant, may be disposed in the cavity 20 to at least partially fill the cavity 20 sufficiently to seal any opening around the cable portions 26, 28 passing through the respective slots 16, 18. For example, the sealant 68, such as a minimally expanding urethane foam or a room temperature vulcanizing (RTV) compound may be injected into the cavity 20 and allowed to cure to seal any openings around the cable portions 26, 28.

Figure 8:
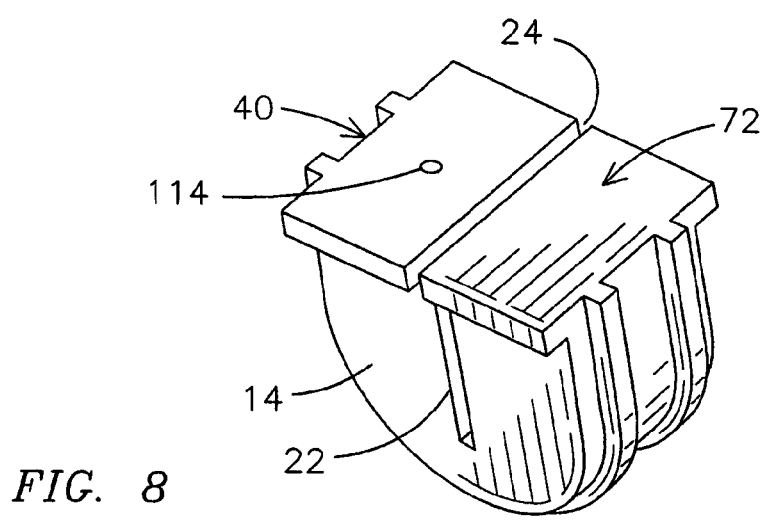
FIG. 8 is an isometric view of another exemplary embodiment of the cable sealing device of FIG. 1.

In an embodiment depicted in FIG. 8, the top 40 of the member 14 may be covered by a top member 72 so that the cavity 20 is enclosed. The slots 22, 24 may be extended through the top member 72 so that a cable may be downwardly inserted into the member 14. A hole 114 may be provided in the member 14, for example, in the top member 72, for injecting a flowable sealant into the cavity 20 enclosed by the top member 72. A nipple (not shown), in communication with the hole 114, may be provided to facilitate injection of the sealant into the cavity 20.

Figure 10:
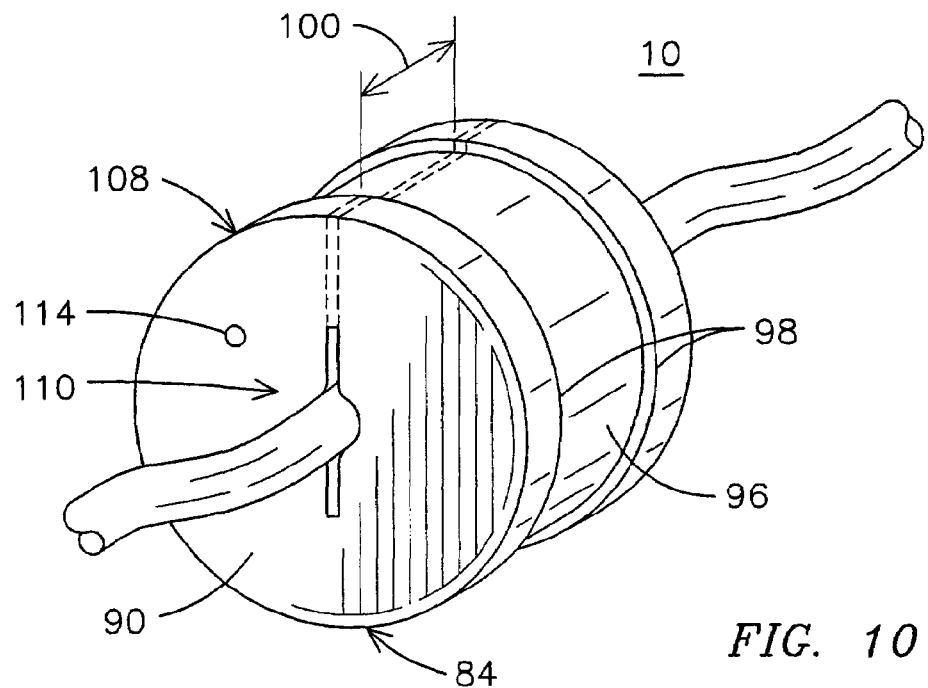
FIG. 10 is an isometric view of an exemplary embodiment of a cable sealing device showing a cable passing therethrough.
Figure 11:
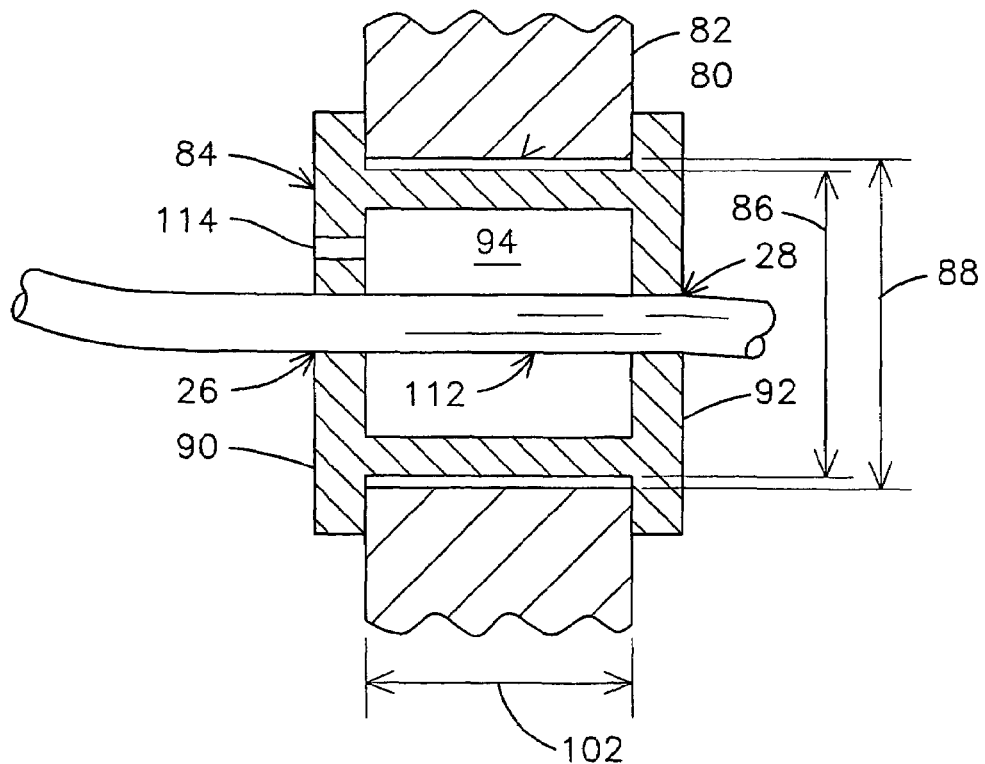
FIG. 11 is a cross sectional view of the cable sealing device of FIG. 10 disposed in a cable receiving aperture of a wall.

FIGS. 10 and 11 depict another exemplary embodiment of the cable sealing device 10 for use in a circular cable receiving aperture 80, such as a bored aperture formed in a wall 82. FIG. 10 is an isometric view of an exemplary embodiment of a cable sealing device 10 showing a cable 12 passing therethrough. FIG. 11 is a cross sectional view of the cable sealing device 10 of FIG. 10 disposed in a cable receiving aperture 80 of the wall 82. The cable sealing device 10 includes a member 84, for example, having a cylindrical shape, and adapted to be fitted into the circular cable receiving aperture 80. The member 84 includes a first wall 90 and a second wall 92 spaced apart from the first wall 90 to partially define a cavity 94 between the walls 90, 92. A transverse member 96 is disposed between and interconnects the first 90 and second walls 92 to further define the cavity 94 between the walls 90, 92. In an embodiment of the invention, the member 84 may be formed from an elastomeric material such as neoprene or EPDM having a desired Shore A durometer hardness.

In an aspect of the invention, the transverse member 96 may be disposed remotely from periphery edges 98 of each respective wall 90, 92, so that the member 84 has a spool shape. The peripheral edges 98 of the respective walls 90, 92 provide a seal between the wall 82 and the member 84 when the member is installed in the aperture 80 and retain the member 84 in the aperture 80. A diameter 86 of the member 84, for example, measured relative to the transverse member 96, may be sized slightly smaller than a diameter 88 of the aperture 80 for fitting the member 84 within the aperture 80. A spacing 100 between the walls 90, 92 may correspond to a depth 102 of the cable receiving aperture 80 in which the member 84 is fitted.

Each of the walls 90, 92 includes a respective cable receiving slot 104, 106 to deformably accommodate cable portions 26, 28 extended through the respective slots 90, 92.

In an aspect of the invention, each cable receiving slot 104, 106 may extend from a periphery 108 of the member 84 (as shown by dotted lines) to at least a central region 110 of each of the walls 90, 92. The slots 104, 106 in the respective walls 90, 92 cooperate to provide a redundant seal around a cable portion 112 passing through the member 84.

In an aspect of the invention, a sealant, such as a flowable sealant, may be disposed in the cavity 94 to at least partially fill the cavity 94 sufficiently to seal any opening around the cable portions 26, 28 passing through the respective slots 104, 106. A hole 114 may be provided in the member 84, such as in one of the walls 90, 92 for injecting a flow able sealant into the cavity 94. A nipple (not shown), in communication with the hole 114, may be provided to facilitate injection of a sealing compound into the cavity 20.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A cable sealing device comprising:
   a member comprising an elastomeric material and adapted to be fitted into a cable receiving aperture, the member comprising a first wall and a second wall spaced apart from the first wall to partially define a cavity between the walls;
   each wall comprising a cable receiving slot formed in the wall, the wall deformable away from the slot to accommodate a cable portion extended through the slot so that the wall is biased around the cable portion to minimize any opening around the cable portion passing through the slot; and
   the slots in the respective walls cooperating to provide a redundant seal around a cable portion passing through the member.

2. The cable sealing device of claim 1, further comprising a sealant disposed in the cavity to at least partially fill the cavity sufficiently to seal any opening around the cable portion passing through the slot.

3. The cable sealing device of claim 2, further comprising a sealant receiving aperture in at least one of the walls for injecting the sealant into the cavity.

4. The cable sealing device of claim 1, wherein the cable receiving slot in the first wall extends from a peripheral edge of the first wall to at least a central region of the first wall.

5. The cable sealing device of claim 1, wherein the cable receiving slot in the second wall extends from a peripheral edge of the second wall to at least a central region of the second wall.

6. The cable sealing device of claim 1, further comprising a transverse member disposed between and interconnecting the first and second walls.

7. The cable sealing device of claim 6, wherein the transverse member is disposed remotely from a peripheral edge of each respective wall.

8. The cable sealing device of claim 7, wherein a spacing between the walls corresponds to a depth of the cable receiving aperture in which the member is being fitted.

9. The cable sealing device of claim 1, wherein the elastomeric material comprises a Shore A durometer hardness between about 35 to 45.

10. The cable sealing device of claim 9, wherein the elastomeric material comprises a Shore A durometer hardness between about 38 to 42.

11. The cable sealing device of claim 1, wherein the slot comprises an enlarged opening section.

12. The cable sealing device of claim 11, wherein the enlarged opening section comprises a circular shape.

13. The cable sealing device of claim 11, wherein the enlarged opening section comprises a "D" shape.

14. The cable sealing device of claim 1, wherein the slot comprises a cross shape.

15. An enclosure comprising the cable sealing device of claim 1.

16. A cable sealing device comprising:
a "U"-shaped member comprising an elastomeric material and adapted to be fitted in a correspondingly shaped cable receiving aperture, the member comprising a first wall and a second wall spaced apart from the first wall, and a transverse member disposed between and interconnecting the first and second walls to define a cavity between the walls having an opening at a top of the member;
a top edge of the first wall, a top edge of the second wall, and opposing top edges of the transverse member forming a sealing periphery at the top of the member for sealing the member against a flat surface disposed over the top;
each wall comprising a cable receiving slot extending downwardly from the opening to at least a central region of the wall, the wall deformable away from the slot to accommodate a cable portion extended through the slot so that the wall is biased around the cable portion to minimize any opening around the cable portion passing through the slot; and
the slots in the respective walls cooperating to provide a redundant seal around a cable portion passing through the member.

17. The cable sealing device of claim 16, the top edge of each wall comprising a lip extending outwardly from the wall to form a sealing surface at the top edge thicker than a thickness of the wall.

18. The cable sealing device of claim 16, further comprising a sealant disposed in the cavity to at least partially fill the cavity sufficiently to seal any opening around the cable portion passing through the slot.

19. The cable sealing device of claim 18, further comprising a sealant receiving aperture in at least one of the walls for injecting the sealant into the cavity.

20. The cable sealing device of claim 16, wherein the transverse member further comprises a rib extending outwardly from the transverse member adapted to be fitted in a correspondingly shaped recess in the cable receiving aperture when the member is fitted into the cable receiving aperture.

21. An enclosure comprising the cable sealing device of claim 16.

22. A cable sealing device comprising:
a "U"-shaped member comprising an elastomeric material and adapted to be fitted in a correspondingly shaped cable receiving aperture, the member comprising a first wall and a second wall spaced apart from the first wall, and a transverse member disposed between and interconnecting respective peripheral edges of the first and second walls to define a cavity between the walls having an opening at a top of the member, the transverse member further comprising a rib extending outwardly from the transverse member adapted to be fitted in a correspondingly shaped recess in the cable receiving aperture when the member is fitted into the cable receiving aperture;
a top edge of the first wall, a top edge of the second wall, and opposing top edges of the transverse member forming a sealing periphery at the top of the member for sealing the member against a flat surface disposed over the top, the top edge of each wall comprising a lip extending outwardly from the wall to form a sealing surface at the top edge thicker than a thickness of the wall;
each wall comprising a cable receiving slot extending downwardly from the opening to at least a central region of the wall, the wall deformable away from the slot to accommodate a cable portion extended through the slot so that the wall is biased around the cable portion to minimize any opening around the cable portion passing through the slot; and
the slots in the respective walls cooperating to provide a redundant seal around a cable portion passing through the member.

23. The cable sealing device of claim 22, further comprising a sealant disposed in the cavity to at least partially fill the cavity sufficiently to seal any opening around the cable portion passing through the slot.

24. An enclosure comprising the cable sealing device of claim 22.

* * * * *